US012593198B2

(12) United States Patent      (10) Patent No.: US 12,593,198 B2

Bansal et al.      (45) Date of Patent: Mar. 31, 2026

(54) METHOD AND APPARATUS FOR EXCHANGING SERVICE INFORMATION IN ULTRA-WIDE BAND SYSTEM

(71) Applicant: Samsung Electronics Co., Ltd., Gyeonggi-do (KR)

(72) Inventors: Ankur Bansal, Nagar (IN); Karthik Srinivasa Gopalan, Bengaluru (IN); Aniruddh Rao Kabbinale, Bellary (IN)

(73) Assignee: Samsung Electronics Co., Ltd. (KR)

( * ) Notice: Subject to any disclaimer, the term of this patent is extended or adjusted under 35 U.S.C. 154(b) by 448 days.

(21) Appl. No.: 18/007,555

(22) PCT Filed: Jun. 4, 2021

(86) PCT No.: PCT/KR2021/007033

§ 371 (c)(1),
(2) Date: Dec. 1, 2022

(87) PCT Pub. No.: WO2021/251694

PCT Pub. Date: Dec. 16, 2021

(65) Prior Publication Data

US 2023/0276212 A1     Aug. 31, 2023

(30) Foreign Application Priority Data

Jun. 9, 2020    (IN) .............................. 202041024092
May 25, 2021   (IN) .............................. 202041024092

(51) Int. Cl.
    *H04W 4/00*       (2018.01)
    *H04W 4/50*       (2018.01)
    *H04W 4/80*       (2018.01)

(52) U.S. Cl.
    CPC ............... *H04W 4/50* (2018.02); *H04W 4/80* (2018.02)

(58) Field of Classification Search
    CPC ................................... H04W 4/50; H04W 4/80
    (Continued)

(56) References Cited

U.S. PATENT DOCUMENTS 7,359,674 B2 *   4/2008   Markki ................. H04W 48/08
                                370/338
7,831,717 B2 *   11/2010   Palin ...................... H04W 8/005
                                709/227

(Continued)

FOREIGN PATENT DOCUMENTS

EP       2 858 421       4/2015
KR    10-2012-0052549       5/2012
              (Continued)

OTHER PUBLICATIONS

European Search Report dated Nov. 23, 2023 issued in counterpart application No. 21822004.4-1213, 18 pages.

(Continued)

*Primary Examiner* — Marceau Milord

(74) *Attorney, Agent, or Firm* — The Farrell Law Firm, P.C.

(57) ABSTRACT

A method performed by a first ultra-wideband (UWB) device in a wireless communication system is provided. The method may include: transmitting, to a second UWB device, a request message for fetching service related information for at least one service; and in case that the at least one service is supported by the second UWB device, receiving, from the second UWB device, a response message including the service related information for the at least one service.

7 Claims, 7 Drawing Sheets

(58) Field of Classification Search

USPC .......................................................... 370/329

See application file for complete search history.

(56) References Cited

U.S. PATENT DOCUMENTS

| | | | |
|---|---|---|---|
| 9,854,507 B2* | 12/2017 | Qi | H04L 67/1068 |
| 10,264,038 B2* | 4/2019 | Kafle | H04L 65/61 |
| 10,486,646 B2* | 11/2019 | Ledvina | H04W 12/50 |
| 10,681,151 B2* | 6/2020 | Jones | H04W 4/00 |
| 11,387,861 B2* | 7/2022 | Kabbinale | H04B 1/7163 |
| 11,522,919 B2* | 12/2022 | Yoon | H04L 63/0442 |
| 11,533,310 B2* | 12/2022 | Fach | H04L 63/0435 |
| 11,728,841 B2* | 8/2023 | Kabbinale | H04W 4/50 |
| | | | 375/130 |
| 11,792,058 B1* | 10/2023 | Kim | H04W 52/18 |
| | | | 375/262 |
| 12,002,312 B2* | 6/2024 | Pirch | G07C 9/22 |
| 2007/0141986 A1 | 6/2007 | Kuehnel et al. | |
| 2008/0301301 A1 | 12/2008 | Palin et al. | |
| 2012/0022948 A1* | 1/2012 | Jones | H04L 67/75 |
| | | | 705/14.64 |
| 2012/0124400 A1 | 5/2012 | Yoon | |
| 2016/0164933 A1* | 6/2016 | Kafle | H04L 65/1069 |
| | | | 709/219 |
| 2016/0234758 A1* | 8/2016 | Qi | H04W 48/14 |
| 2019/0134933 A1* | 5/2019 | Kitamura | B30B 15/047 |
| 2019/0135229 A1* | 5/2019 | Ledvina | H04W 12/50 |
| 2020/0062217 A1 | 2/2020 | Ledvina et al. | |
| 2020/0106877 A1* | 4/2020 | Ledvina | H04W 12/06 |
| 2020/0252436 A1* | 8/2020 | Yoon | H04L 63/18 |
| 2021/0250351 A1* | 8/2021 | Fach | G06F 1/3209 |
| 2021/0312424 A1* | 10/2021 | Lee | G06Q 20/3825 |
| 2021/0360395 A1* | 11/2021 | Lemsitzer | H04W 4/06 |
| 2022/0345174 A1* | 10/2022 | Kabbinale | H04B 1/69 |
| 2022/0375286 A1* | 11/2022 | Pirch | H04B 1/69 |
| 2022/0404448 A1* | 12/2022 | Koo | G01S 5/0009 |
| 2022/0416989 A1* | 12/2022 | Lee | H04W 48/10 |

FOREIGN PATENT DOCUMENTS

| | | |
|---|---|---|
| WO | WO 2006/120556 | 11/2006 |
| WO | WO 2019/067105 | 4/2019 |

OTHER PUBLICATIONS

PCT/ISA/210, International Search Report dated Sep. 24, 2021 issued in counterpart application No. PCT/KR2021/007033, 3 pages.

PCT/ISA/237, Written Opinion dated Sep. 24, 2021 issued in counterpart application No. PCT/KR2021/007033, 4 pages.

European Search Report dated Aug. 17, 2023 issued in counterpart application No. 21822004.4-1213, 14 pages.

EP Communication Report dated Dec. 17, 2024 issued in counterpart application No. 21822004.4-1206, 8 pages.

Indian Examination Report dated Aug. 4, 2022 issued in counterpart application No. 202041024092, 6 pages.

European Search Report dated Aug. 19, 2025 issued in counterpart application No. 21822004.4-1218, 13 pages.

* cited by examiner

[Fig. 1A]
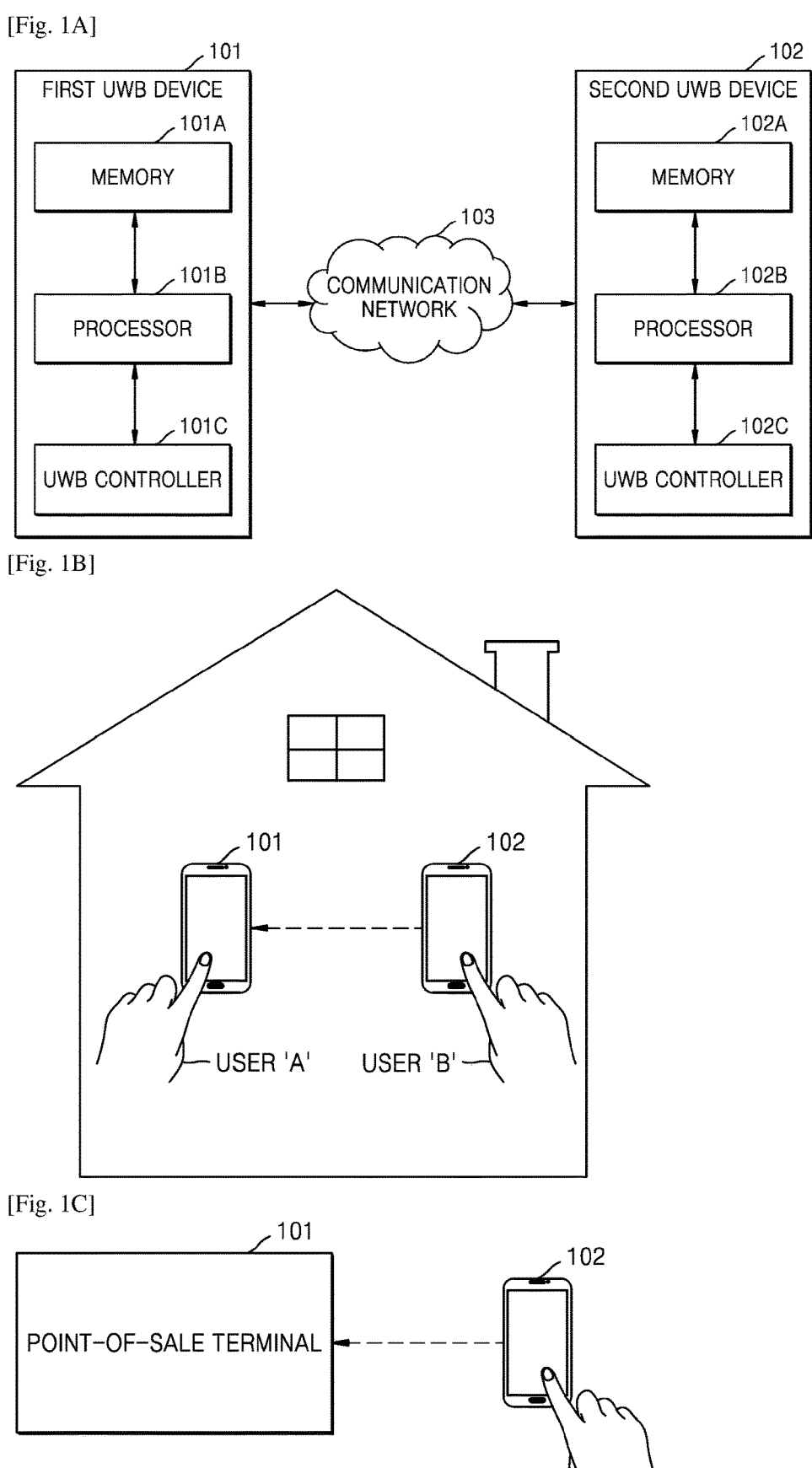
[Fig. 1B]
[Fig. 1C]

[Fig. 1D]
[Fig. 1E]
[Fig. 1F]
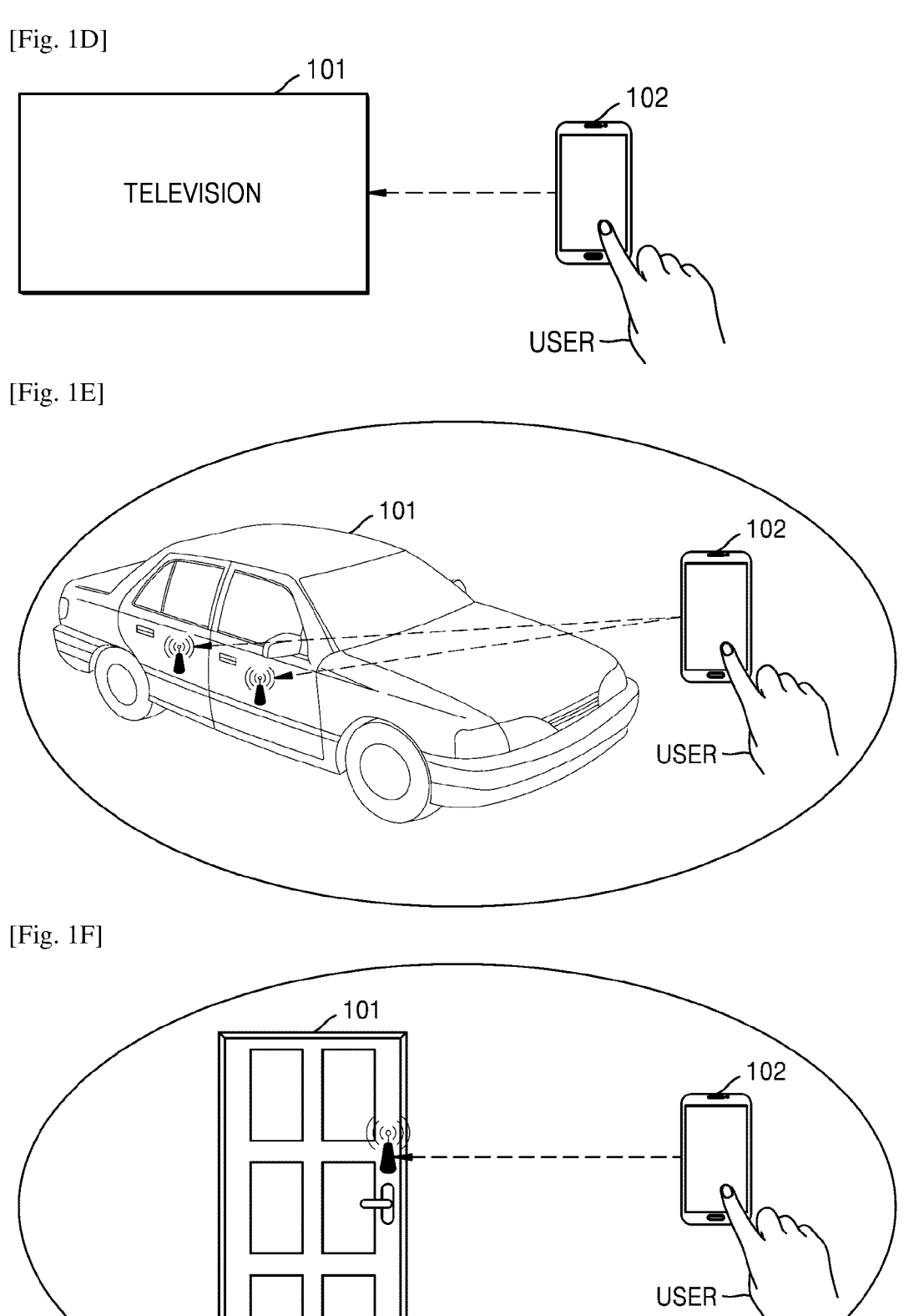

[Fig. 2]

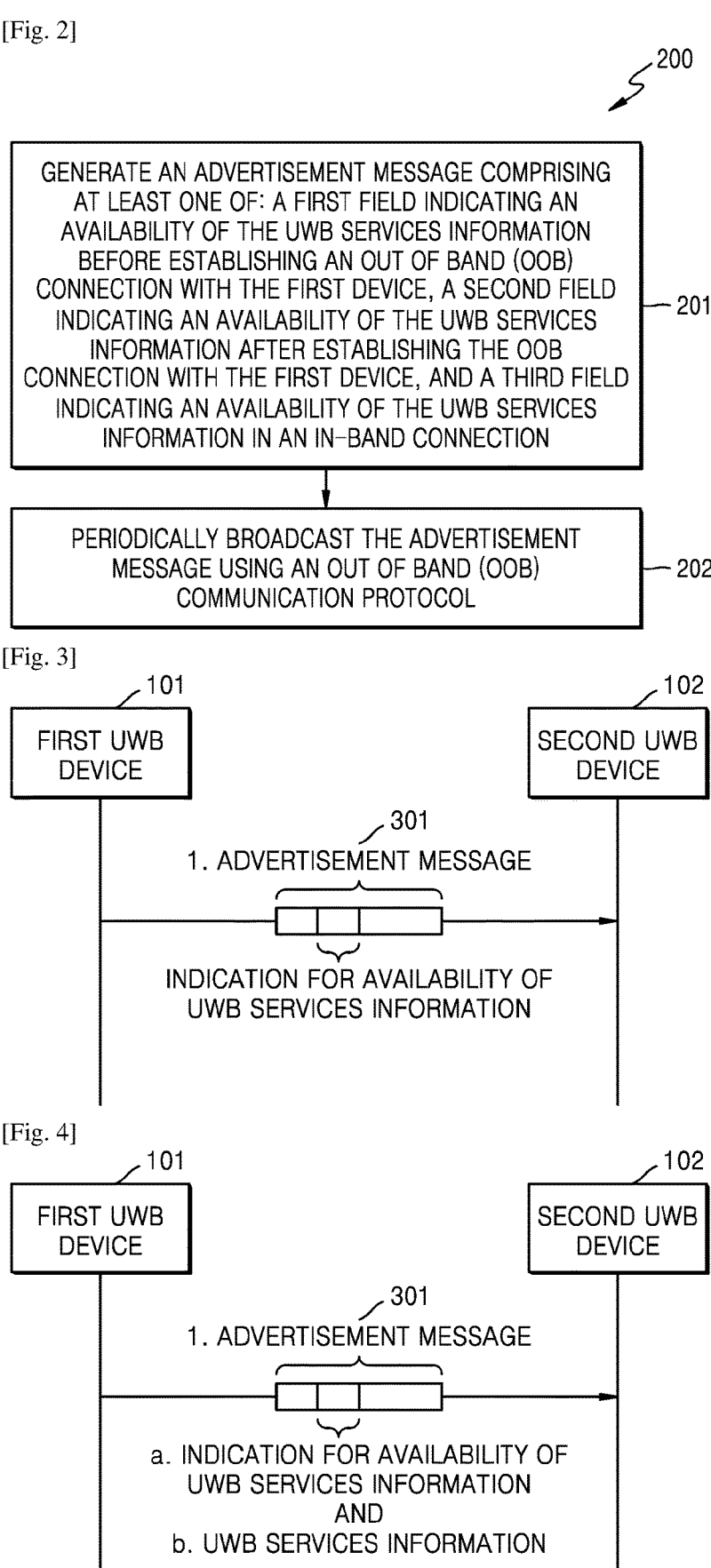

200

GENERATE AN ADVERTISEMENT MESSAGE COMPRISING AT LEAST ONE OF: A FIRST FIELD INDICATING AN AVAILABILITY OF THE UWB SERVICES INFORMATION BEFORE ESTABLISHING AN OUT OF BAND (OOB) CONNECTION WITH THE FIRST DEVICE, A SECOND FIELD INDICATING AN AVAILABILITY OF THE UWB SERVICES INFORMATION AFTER ESTABLISHING THE OOB CONNECTION WITH THE FIRST DEVICE, AND A THIRD FIELD INDICATING AN AVAILABILITY OF THE UWB SERVICES INFORMATION IN AN IN–BAND CONNECTION — 201

PERIODICALLY BROADCAST THE ADVERTISEMENT MESSAGE USING AN OUT OF BAND (OOB) COMMUNICATION PROTOCOL — 202

[Fig. 3]

101
FIRST UWB DEVICE

102
SECOND UWB DEVICE 301
1. ADVERTISEMENT MESSAGE

INDICATION FOR AVAILABILITY OF UWB SERVICES INFORMATION

[Fig. 4]

101
FIRST UWB DEVICE

102
SECOND UWB DEVICE 301
1. ADVERTISEMENT MESSAGE a. INDICATION FOR AVAILABILITY OF UWB SERVICES INFORMATION
AND
b. UWB SERVICES INFORMATION

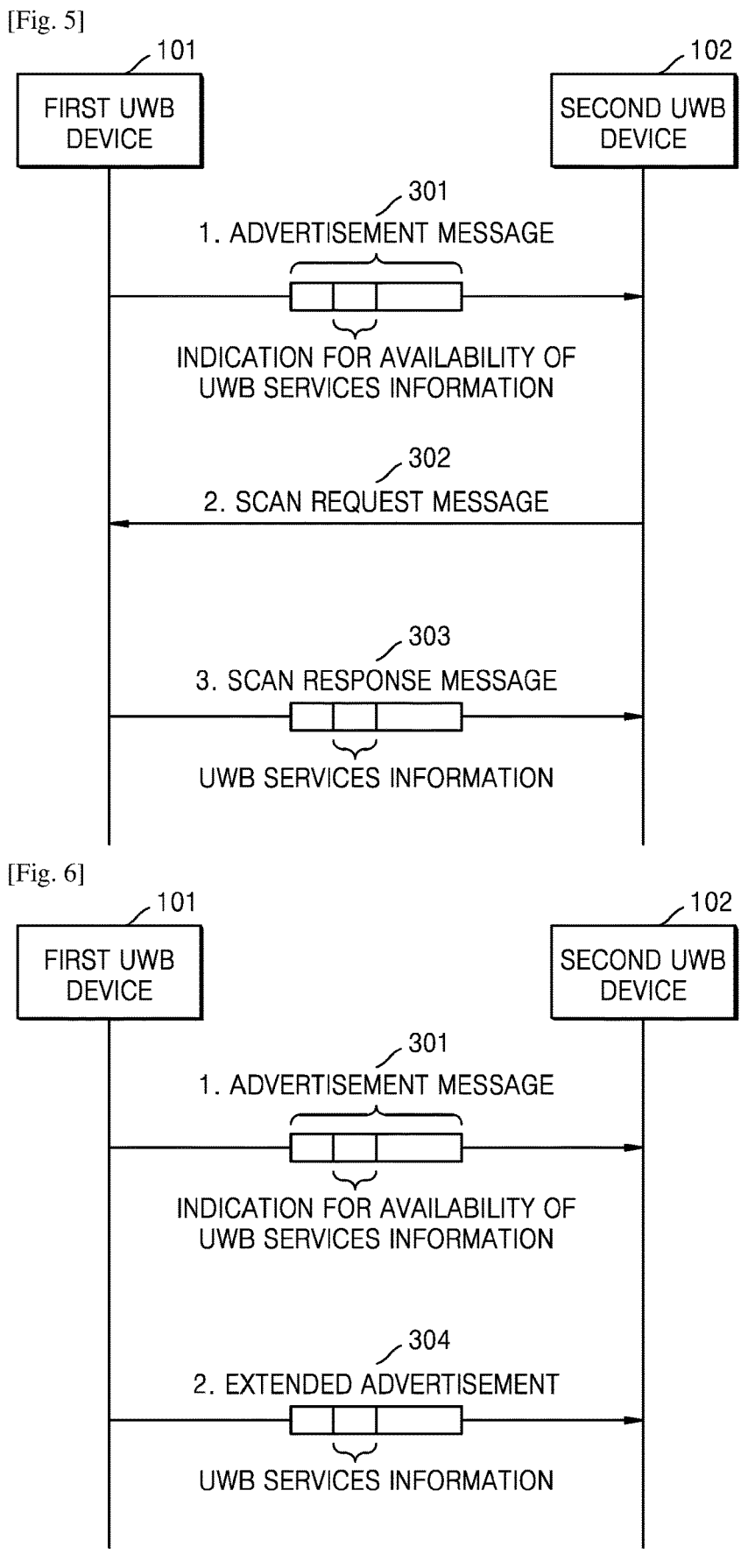

[Fig. 7]
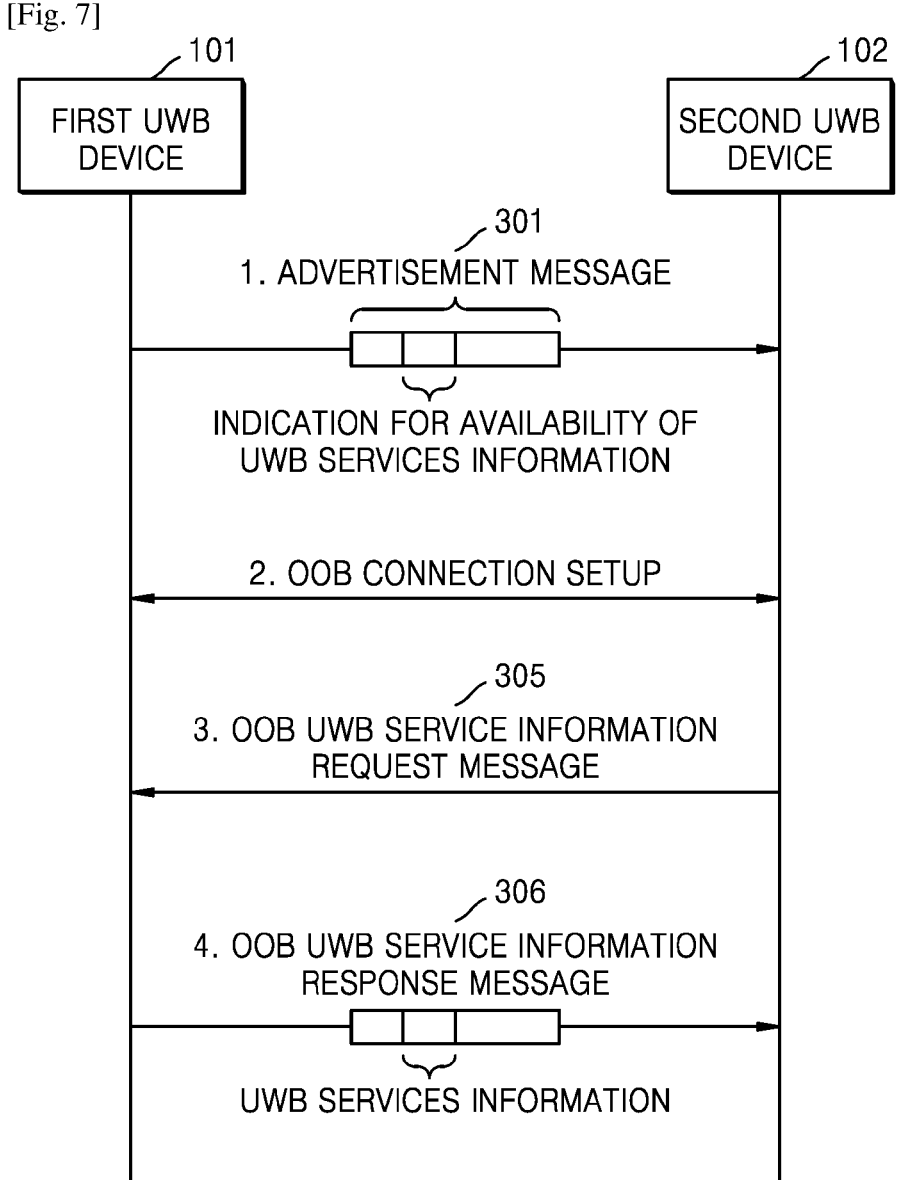

[Fig. 8]
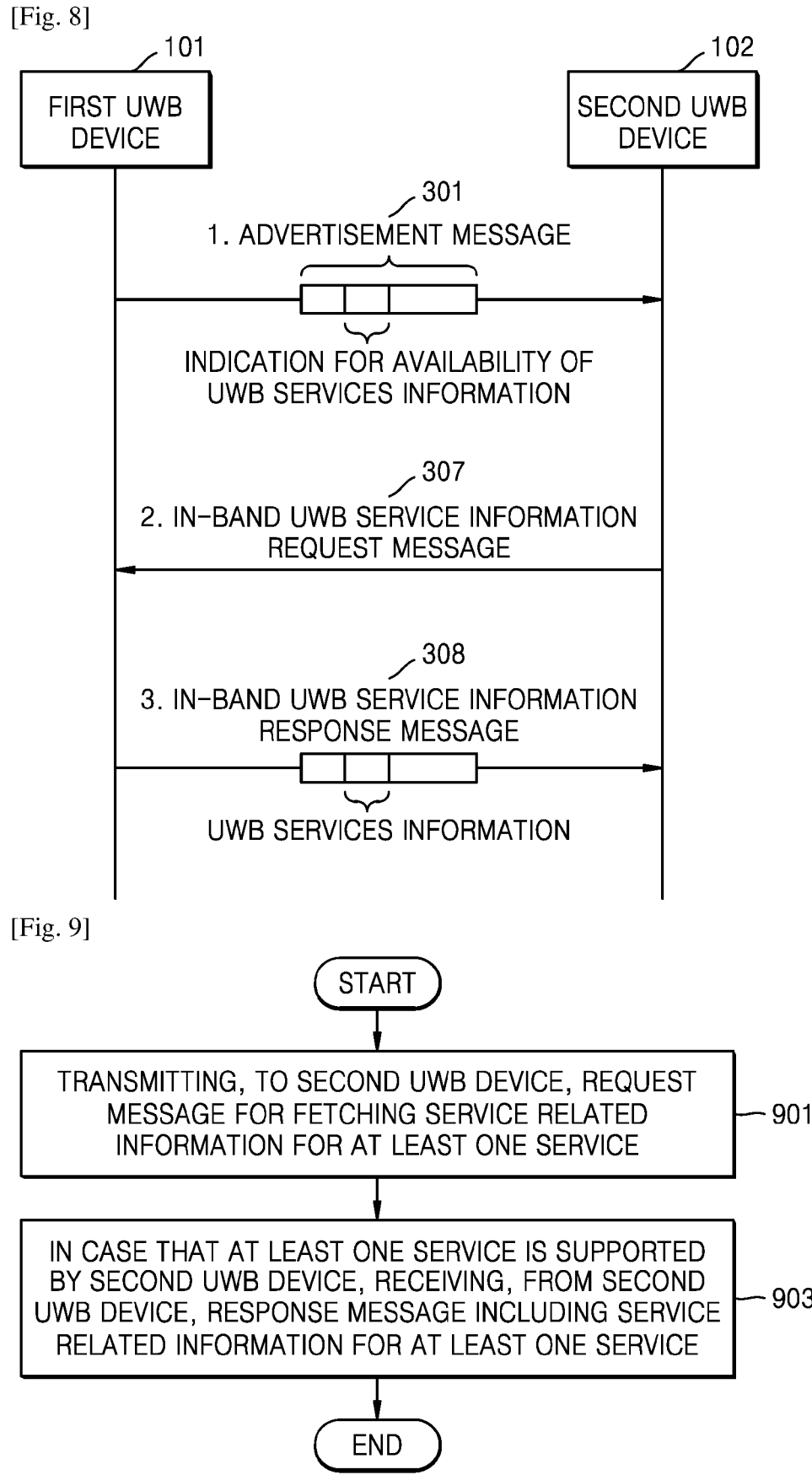
[Fig. 9]

[Fig. 10]

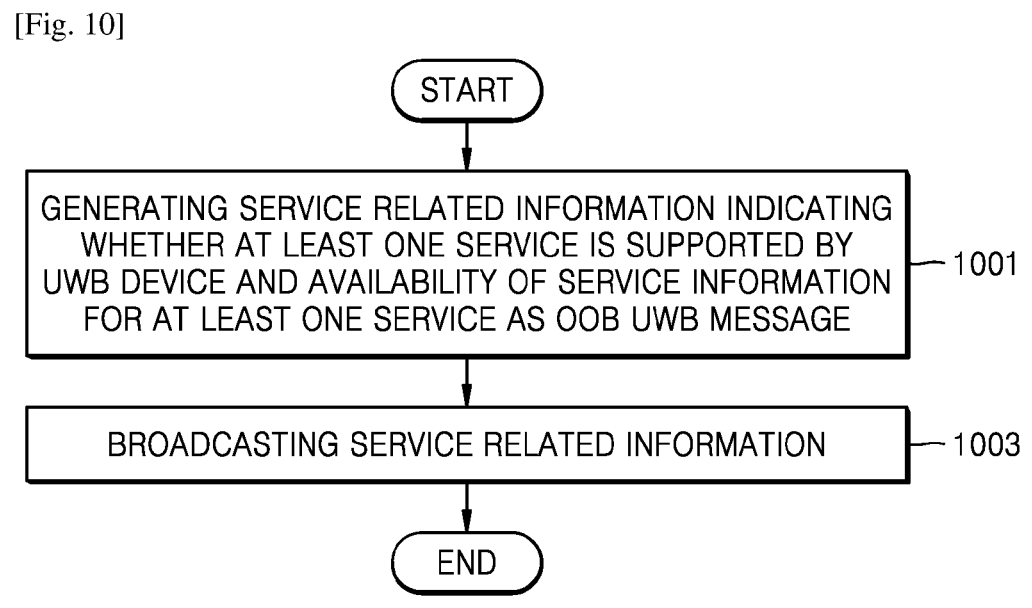

```
                    ┌─────────┐
                    │  START  │
                    └─────────┘
                         │
                         ▼
┌──────────────────────────────────────────────────────────┐
│  GENERATING SERVICE RELATED INFORMATION INDICATING        │
│  WHETHER AT LEAST ONE SERVICE IS SUPPORTED BY             │──1001
│  UWB DEVICE AND AVAILABILITY OF SERVICE INFORMATION       │
│  FOR AT LEAST ONE SERVICE AS OOB UWB MESSAGE              │
└──────────────────────────────────────────────────────────┘
                         │
                         ▼
┌──────────────────────────────────────────────────────────┐
│       BROADCASTING SERVICE RELATED INFORMATION            │──1003
└──────────────────────────────────────────────────────────┘
                         │
                         ▼
                    ┌─────────┐
                    │   END   │
                    └─────────┘
```

METHOD AND APPARATUS FOR EXCHANGING SERVICE INFORMATION IN ULTRA-WIDE BAND SYSTEM

PRIORITY

This application is a National Phase Entry of PCT International Application No. PCT/KR2021/007033, which was filed on Jun. 4, 2021, and claims priority to Indian Provisional Patent Application No. 202041024092, which was filed on Jun. 9, 2020, and Indian Complete patent application Ser. No. 202041024092, which was filed on May 25, 2021, the entire content of each of which is incorporated herein by reference.

TECHNICAL FIELD

The present disclosure relates to field of Ultra-wideband radio system. In particular, the present disclosure relates to a method for exchanging services information in an Ultra-Wide Band system.

BACKGROUND ART

In recent times, Ultra-WideBand (UWB) technology is gaining prominence for enabling secure and accurate ranging between devices. A device with UWB communication capability supports a plurality of UWB services. For example, the UWB services include a UWB Physical access control systems (PACS), a UWB payment service, a UWB ticket service, a UWB proximity based file exchange service and the like. Further, the device may support a subset of services from the plurality of UWB services. For example, a payment terminal supports a payment service for processing of a payment transaction and the payment terminal may not support a file exchange service.

The existing techniques, do not provide a method for conveying a list of one or more UWB services supported by the device. Further, the existing techniques do not provide a method for conveying UWB services information. Furthermore, the existing techniques do not provide a method for conveying if a particular service from the plurality of services are supported by the device.

Thus, it is desired to address the above mentioned disadvantages or other shortcomings or at least provide a useful alternative.

DISCLOSURE OF INVENTION

Solution to Problem

The disclosure provides a method and an apparatus for transmitting information indicating whether a service is supported by an UWB device.

BRIEF DESCRIPTION OF DRAWINGS

The proposed UWB device and a method illustrated in the accompanying drawings, throughout which like reference letters indicate corresponding parts in the various figures. The embodiments herein will be better understood from the following description with reference to the drawings, in which:

FIG. 1A illustrates an example for communicating Ultra-Wide Band (UWB) services information supported by a first UWB device to a second UWB device, according to the embodiments as disclosed herein;

FIG. 1B illustrates a use case for performing a peer to peer payment and proximity based file transfer between a first UWB device and the second UWB device, according to the embodiments as disclosed herein;

FIG. 1C illustrates a use case of performing a payment transaction between a first UWB device and the second UWB device, according to the embodiments as disclosed herein;

FIG. 1D illustrating a scenario of using a UWB enabled phone as a remote control and a gaming joystick for operating a Television, according to the embodiments as disclosed herein;

FIG. 1E illustrating a scenario of using a UWB enabled phone as an access key for operating a car, according to the embodiments as disclosed herein;

FIG. 1F illustrating a scenario of using a UWB enabled phone as a key for operating a door lock, according to the embodiments as disclosed herein;

FIG. 2 shows a flowchart illustrating a method of communicating Ultra-Wide Band (UWB) services information supported by a first UWB device to a second UWB device, according to the embodiments as disclosed herein;

FIG. 3 shows a signaling diagram illustrating a broadcast of an advertisement message indicating an availability of UWB services information, according to the embodiments as disclosed herein;

FIG. 4 shows a signaling diagram illustrating a broadcast of an advertisement message indicating an availability of UWB services information in the advertisement message and the UWB services information in the advertisement message, according to the embodiments as disclosed herein;

FIG. 5 shows a signaling diagram illustrating a broadcast of an advertisement message indicating an availability of UWB services information as a part of scan request and scan response message and the exchange of the UWB services information using scan request and scan response message, according to the embodiments as disclosed herein;

FIG. 6 shows a signaling diagram illustrating a broadcast of an advertisement message indicating an availability of UWB services information in an extended advertisement message and the UWB services information in the extended advertisement message, according to the embodiments as disclosed herein;

FIG. 7 shows a signaling diagram illustrating a broadcast of an advertisement message indicating an availability of UWB services information post-connection and exchange of UWB services information after establishing an Out of Band (OOB) connection, according to the embodiments as disclosed herein;

FIG. 8 shows a signaling diagram illustrating a broadcast of an advertisement message indicating an availability of UWB services information in an in-band connection and exchange of UWB services information using the in-band connection, according to the embodiments as disclosed herein;

FIG. 9 illustrates a flow chart of a method performed by a first UWB device according to an embodiment of the disclosure; and FIG. 10 illustrates a flow chart of a method performed by an UWB device according to an embodiment of the disclosure.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Also, it will be understood that although the terms "first," "second," etc. may be used herein to describe various elements, these elements should not be limited by these terms. These terms are only used to distinguish one component from another.

Also, the terms used herein are for the purpose of describing particular embodiments of the disclosure and are not intended to limit the scope of the disclosure. As used herein, the singular forms "a," "an," and "the" are intended to include the plural forms as well, unless the context clearly indicates otherwise. Also, it will be understood that when a region is referred to as being "connected to" or "coupled to" another region, it may be "directly connected or coupled to" the other region or "electrically connected to" the other region. It will be understood that terms such as "comprise," "include," and "have," when used herein, specify the presence of stated elements, but do not preclude the presence or addition of one or more other elements.

The use of the term "the" and a similar definite term in the specification is to be construed to cover both the singular and the plural. Also, operations of all methods described herein may be performed in any suitable order unless otherwise clearly indicated herein. The disclosure is not limited to the order of the described operations.

The phrase "in an embodiment of the disclosure" appearing in various places in the specification does not necessarily refer to the same embodiment of the disclosure.

An embodiment of the disclosure may be represented by functional block configurations and various processing operations. All or part of such functional blocks may be implemented by any number of hardware and/or software components configured to perform particular functions. For example, the functional blocks of the disclosure may be implemented as one or more microprocessors or may be implemented as circuit configurations for certain functions. Also, for example, the functional blocks of the disclosure may be implemented with various programming or scripting languages. The functional blocks may be implemented as algorithms that are executed on one or more processors. Also, the disclosure may employ any techniques for electronic environment configuration, signal processing, and/or data processing.

Also, the connecting lines or connecting members illustrated in the drawings are intended to represent functional connections and physical or logical connections between elements. In a real device, connections between elements may be represented by various functional connections, physical connections, or circuit connections that are replaceable or added.

In general, wireless sensor network technologies are largely classified into wireless local area network (WLAN) technologies and wireless personal area network (WPAN) technologies according to recognition distance. WLAN is a technology based on IEEE 802.11 and is a technology that allows a connection to a backbone network within a radius of about 100 m. WPAN is a technology based on IEEE 802.15 and includes Bluetooth, ZigBee, and ultra wide band (UWB). A wireless network in which such a wireless network technology is implemented may include a plurality of communication electronic devices. The communication electronic devices perform communication in an active period by using a single channel. That is, the communication electronic devices may collect packets and transmit the collected packets in the active period.

UWB may refer to a short-range high-speed wireless communication technology using a wide frequency band of several GHz or more in a baseband state, a low spectral density, and a short pulse width (1-4 nsec). UWB may refer to the band itself to which UWB communication is applied. Hereinafter, a method of ranging between electronic devices will be described based on a UWB communication scheme, but this is only an example. In practice, various wireless communication technologies may be used.

Electronic devices according to embodiments of the disclosure may include a fixed terminal or a mobile terminal implemented as a computer device and may communicate with other devices and/or servers by using a wireless or wired communication scheme. For example, the electronic devices may include smart phones, mobile terminals, laptop computers, digital broadcasting terminals, personal digital assistants (PDAs), portable multimedia players (PMPs), navigations, slate personal computers (PCs), tablet PCs, desktop computers, digital televisions (TVs), refrigerators, artificial intelligence speakers, wearable devices, projectors, smart keys, smart cars, printers, etc., but are not limited to these examples.

The principal object of the embodiments herein is to provide a method for exchanging services information in an Ultra-Wide Band system.

Another objective of the embodiments herein is to provide a technique for conveying a list of UWB services supported by a UWB device.

Another objective of the embodiments herein is to provide technique to query a support for one or more services in a UWB device.

Another objective of the embodiments herein is to provide a technique for conveying a support for one or more UWB services supported by a UWB device in response to a query.

Another objective of the embodiments herein is to provide a technique for indicating an availability of the UWB services information.

Another objective of the embodiments herein is to provide a technique for providing the UWB services information to a UWB device.

Another objective of the embodiments herein is to provide a technique for indicating a means of transmission of the UWB services information.

Another objective of the embodiments herein is to provide a technique for conveying a miscellaneous service information for services supported by a UWB device.

Accordingly the embodiment herein is to provide a method of communicating UltraWide Band (UWB) services information. The method comprising generating, by the first UWB device, an advertisement message comprising at least one of a first field indicating an availability of the UWB services information before establishing an Out of Band (OOB) connection with the first device, a second field indicating an availability of the UWB services information after establishing the OOB connection with the first device, and a third field indicating an availability of the UWB services information in an in-band connection. Further, periodically broadcasting, by the first UWB device, the advertisement message using an Out of Band (OOB) communication protocol.

In an embodiment, the first UWB device and the second UWB device is one of a controller device or a controlee device.

In an embodiment, the first field indicates the availability of the UWB services information in at least one of the advertisement message or an extended advertisement message or a scan response message.

In an embodiment, the UWB services information is obtained from the first device using the OOB communication protocol.

In an embodiment, the second field indicates the availability of the UWB services information in an OOB UWB service information response message.

In an embodiment, the UWB services information in the OOB UWB service information response message is obtained from the first device using the OOB communication protocol.

In an embodiment, the third field indicates the availability of the UWB services information in an in-band UWB service information response message.

In an embodiment, the UWB services information in the in-band UWB service information response message is obtained from the first device using the in-band communication protocol.

In an embodiment, the OOB communication protocol comprises one of a Bluetooth protocol, a Wireless Fidelity (Wi-Fi) protocol, and a Near Field Communication (NFC) protocol.

In an embodiment, the in-band communication protocol comprises a UWB protocol.

In an embodiment, the UWB services information is denoted using a bitmask representation.

In an embodiment, the UWB services information is denoted using one or more UWB service information Identification value corresponding to the one or more UWB services.

In an embodiment, the method comprises receiving, by the first UWB device, a OOB UWB service information request message from the second UWB device after establishing the OOB connection with the first device, wherein the OOB UWB service information request message comprises a query for a support of the one or more UWB services by the first UWB device and the UWB services information corresponding to the one or more UWB services. Further, generating, by the first UWB device, a OOB UWB service information response message comprising a support for a subset of the one or more UWB services supported by the first device and the UWB services information corresponding to the one or more UWB services. Furthermore, sending, by the first UWB device, the OOB UWB service information response message to the second UWB device.

In an embodiment, the OOB UWB service information request message is a CMD_GET_SERVICE_INFO comprising a value of a request type as GET.

In an embodiment, the OOB UWB service information request message for obtaining the UWB services information comprises a Num_of_Service field indicating a count of the one or more UWB services for which the UWB services information is requested. Further, one or more Service_ID fields indicating a UWB service Identification value corresponding to the one or more UWB services.

In an embodiment, the OOB UWB service information response message for providing the UWB services information comprises a Num_of_Service field indicating a count of the one or more UWB services supported by the first device. Further, one or more Service_ID fields indicating a UWB service Identification value corresponding to the one or more UWB services supported by the first device. Furthermore, one or more common parameters field. Thereafter, a length of extended service information field indicating a length of the extended service information field in bytes, and an extended service information data.

In an embodiment, the method comprises receiving, by the first UWB device, an in-band UWB service information request message from the second UWB device in an in-band connection, wherein the in-band UWB service information request message comprises a query for a support of the one or more UWB services by the first UWB device and the UWB services information corresponding to the one or more UWB services. Further, generating, by the first UWB device, an in-band UWB service information response message comprising a support for a subset of the one or more UWB services supported by the first device and the UWB services information corresponding to the one or more UWB services. Furthermore, sending, by the first UWB device, the in-band UWB service information response message to the second UWB device.

In an embodiment, the in-band UWB service information request message is a CMD_GET_SERVICE_INFO comprising a value of a request type as GET.

In an embodiment, the in-band UWB service information request message for obtaining the UWB services information comprises a Num_of_Service field indicating a count of the one or more UWB services for which the UWB services information is requested. Further, one or more Service_ID fields indicating a UWB service Identification value corresponding to the one or more UWB services.

In an embodiment, the in-band UWB service information response message for providing the UWB services information using in-band communication protocol comprises at least one of a Num_of_Service field indicating a count of the one or more UWB services supported. Further, one or more Service_ID fields indicating a UWB service Identification value corresponding to the one or more UWB services supported by the first device. Furthermore, one or more common parameters field. Thereafter, a length of extended service information field indicating a length of the extended service information field in bytes, and an extended service information data.

In an embodiment, periodically broadcasting, by the first UWB device, the advertisement message comprises sending the advertisement message using the OOB communication protocol after completion of a pre-defined time period, wherein the second UWB device receives the advertisement message when the second UWB device is in a communication range of the first UWB device.

Accordingly embodiment herein provide a first Ultra-Wide Band (UWB) device for communicating UWB services information. The first UWB device comprises a memory, a processor, and a UWB controller communicatively coupled to the processor and the memory. The UWB controller is configured to generate in the first UWB device, an advertisement message comprising at least one of a first field indicating an availability of the UWB services information before establishing an Out of Band (OOB) connection with the first device a second field indicating an availability of the UWB services information after establishing the OOB connection with the first device, and a third field indicating an availability of the UWB services information in an in-band connection. Further, the UWB controller is configured to periodically broadcast from the first UWB device, the advertisement message using an Out of Band (OOB) communication protocol.

In an embodiment, the first UWB device and the second UWB device is one of a controller device or a controlee device.

In an embodiment, the first field indicates the availability of the UWB services information in at least one of the advertisement message or an extended advertisement message or a scan response message.

In an embodiment, the UWB services information is obtained from the first device using the OOB communication protocol.

In an embodiment, the second field indicates the availability of the UWB services information in an OOB UWB service information response message.

In an embodiment, the UWB services information in the OOB UWB service information response message is obtained from the first device using the OOB communication protocol.

In an embodiment, the third field indicates the availability of the UWB services information in an in-band UWB service information response message.

In an embodiment, the UWB services information in the in-band UWB service information response message is obtained from the first device using the in-band communication protocol.

In an embodiment, the OOB communication protocol comprises one of a Bluetooth protocol, a Wireless Fidelity (Wi-Fi) protocol, and a Near Field Communication (NFC) protocol.

In an embodiment, the in-band communication protocol comprises a UWB protocol.

In an embodiment, the UWB services information is denoted using a bitmask representation.

In an embodiment, the UWB services information is denoted using one or more UWB service information Identification value corresponding to the one or more UWB services.

In an embodiment, the UWB controller in the first device is configured to receive an OOB UWB service information request message from the second UWB device after establishing the OOB connection with the first device, wherein the OOB UWB service information request message comprises a query for a support of the one or more UWB services by the first UWB device and the UWB services information corresponding to the one or more UWB services. Further, generate a OOB UWB service information response message comprising a support for a subset of the one or more UWB services supported by the first device and the UWB services information corresponding to the one or more UWB services. Furthermore, send the OOB UWB service information response message to the second UWB device.

In an embodiment, the OOB UWB service information request message is a CMD_GET_SERVICE_INFO comprising a value of a request type as GET.

In an embodiment, the OOB UWB service information request message for obtaining the UWB services information comprises a Num_of_Service field indicating a count of the one or more UWB services for which the UWB services information is requested. Further, one or more Service_ID fields indicating a UWB service Identification value corresponding to the one or more UWB services.

In an embodiment, the OOB UWB service information response message for providing the UWB services information comprises a Num_of_Service field indicating a count of the one or more UWB services supported by the first device. Further, one or more Service_ID fields indicating a UWB service Identification value corresponding to the one or more UWB services supported by the first device. Furthermore, one or more common parameters field. Thereafter, a length of extended service information field indicating a length of the extended service information field in bytes, and an extended service information data.

In an embodiment, the UWB controller in the first device is configured to receive an in-band UWB service information request message from the second UWB device in an in-band connection, wherein the in-band UWB service information request message comprises a query for a support of the one or more UWB services by the first UWB device and the UWB services information corresponding to the one or more UWB services. Further, generate an in-band UWB service information response message comprising a support for a subset of the one or more UWB services supported by the first device and the UWB services information corresponding to the one or more UWB services. Furthermore, send the in-band UWB service information response message to the second UWB device.

In an embodiment, the in-band UWB service information request message is a CMD_GET_SERVICE_INFO comprising a value of a request type as GET.

In an embodiment, the in-band UWB service information request message for obtaining the UWB services information comprises a Num_of_Service field indicating a count of the one or more UWB services for which the UWB services information is requested. Further, one or more Service_ID fields indicating a UWB service Identification value corresponding to the one or more UWB services.

In an embodiment, the in-band UWB service information response message for providing the UWB services information using in-band communication protocol comprises at least one of a Num_of_Service field indicating a count of the one or more UWB services supported. Further, one or more Service_ID fields indicating a UWB service Identification value corresponding to the one or more UWB services supported by the first device. Furthermore, one or more common parameters field. Thereafter, a length of extended service information field indicating a length of the extended service information field in bytes, and an extended service information data.

In an embodiment, the UWB controller in the first device is configured to periodically broadcast the advertisement message comprises sending the advertisement message using the OOB communication protocol after completion of a pre-defined time period, wherein the second UWB device receives the advertisement message when the second UWB device is in a communication range of the first UWB device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Referring now to the drawings and more particularly to FIGS. 1 through 8, where similar reference characters denote corresponding features consistently throughout the figures, there are shown preferred embodiments.

FIG. 1A illustrates an example environment for communicating Ultra-Wide Band (UWB) services information supported by a first UWB device to a second UWB device, according to the embodiments as disclosed herein.

In one implementation, Ultra-Wide Band (UWB) services are provided and/or obtained by a first UWB device (101) and a second UWB device (102). The first UWB device (101) and the second UWB device (102) communicate using a communication network. The communication network may include at least one of a wired interface and a wireless interface. The UWB services for example, may include at least one of a payment service, a file transfer service, an access control service, and the like. The UWB services mentioned herein should not be treated as a limitation, rather be treated as examples. The first UWB device (101) and the second UWB device (102) may communicate using at least one of an Out of Band (OOB) communication protocol and an in-band communication protocol. The OOB communication protocol comprises one of a Bluetooth protocol, a Wireless Fidelity (Wi-Fi) protocol, and a Near Field Communication (NFC) protocol. The in-band communication protocol comprises the UWB protocol. The first UWB device (101) and the second UWB device (102) may include at least one of a laptop, a computer, a smartphone, a payment terminal, an access control terminal, an electronic appliance such as television, refrigerator, and the like, an automobile, and the like, In an embodiment, the first UWB device (101) may include a memory (101A), a processor (101B) and an UWB controller (101C) communicatively coupled to the memory (101A) and the processor (101B). The UWB controller (101C) in the first UWB device (101) is configured to indicate an availability of the UWB services information to the second UWB device (102) and send the UWB services information to the second UWB device (102).

The processor (101A) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (101A) may include multiple cores to execute the instructions.

The UWB controller (101C) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the UWB controller (101C) in the first UWB device (101) is configured to generate an advertisement message (301), generate an extended advertisement message (304), and periodically broadcast the advertisement message (301). Further, the UWB controller (101C) in the first UWB device (101) is configured to send the extended advertisement message (304) after sending the advertisement message (301), receive a scan request message (302) from the second UWB device (102), receive an OOB UWB service information request message (305) from the second UWB device (102), receive an in-band UWB service information request message (307) from the second UWB device (102). Furthermore, the UWB controller (101C) in the first UWB device (101) is configured to send a scan response message (303), an OOB UWB service information response message (306), and an in-band UWB service information response message (308) to the second UWB device (102).

In an embodiment, the second UWB device (102) may include a memory (102A), a processor (102B) and an UWB controller (102C) communicatively coupled to the memory (102A) and the processor (102B). The UWB controller (102C) in the second UWB device (102) is configured to receive the advertisement message (301) from the first UWB device (101) when the second UWB device (102) is in a communication range of the first UWB device (101). The advertisement message (301) indicates the availability of the UWB services information. For example, the communication range may be 0.5 meters, 1 meter, 2 meter and the like. Further the communication range is based on at least one of the OOB communication protocol and the in-band communication protocol.

The processor (102B) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (102B) may include multiple cores to execute the instructions.

The UWB controller (102C) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the UWB controller (102C) in the second UWB device (102) is configured to receive an extended advertisement message (304) from the first UWB device (101), send a scan request message (302) to the first UWB device (101), send an OOB UWB service information request message (305) to the first UWB device (101), send an in-band UWB service information request message (307) to the first UWB device (101). Further, the UWB controller (102C) in the second UWB device (102) is configured to receive a scan response message (303), an OOB UWB service information response message (306), and an in-band UWB service information response message (308) from the first UWB device (101).

In an embodiment, first UWB device (101) and the second UWB device (102) is one of a controller device or a controlee device. For example, if the first UWB device (101) is the controller device, the second UWB device (102) is the controlee device. In another example, if the first UWB device (101) is the controlee device, the second UWB device (102) is the controller device. Further, the controlee device indicates a device requesting services from the controller device. For example, consider a file transfer service, the controlee device indicates a device requesting the UWB services information associated with a file transfer request from the controller device.

In an embodiment, the second UWB device (102) identifies the supported UWB services on the first UWB device (101) using the advertisement message (301). The advisement message indicates the availability of the UWB services and a means to obtain the UWB services information. Further, the second UWB device (102) establishes a connection with the first UWB device (101) for using the one or more UWB services of the first UWB device (101).

In an embodiment, the second UWB device (102) requires a UWB service (say for example, Service 'X') from the first UWB device (101). However, the second UWB device (102) has no information regarding the support for the service 'X' by the first UWB device (101). Therefore, the first UWB device (101) periodically broadcasts a list of one or more UWB services supported by the first UWB device (101) and other configuration information associated with the one or more UWB services supported by the first UWB device (101).

In another embodiment, the second UWB device (102) sends a query if service 'X' is supported by the first UWB device (101). The first UWB device (101) responds with a "success or yes" and the other UWB service information if the service 'X' is supported by the first UWB device (101). Alternatively, the first UWB device (101) responds with a "Failure or no" if the service 'X' is not supported by the first UWB device (101). Further, the second UWB device (102) receives the response and avails the one or more UWB services. The periodic broadcast of the one or more UWB services reduces a power consumption in the UWB devices (101 and 102). Further, the indication of the availability of the UWB services information reduces messages exchange and enables faster communication between the UWB devices (101 and 102).

In a first example, consider FIG. 1B illustrating an example use case for performing a peer to peer payment and proximity based file transfer between a first UWB device (101) and the second UWB device (102).

Consider, a User 'B' willing to transfer money to a User 'A' using a proximity based UWB payments service. The User 'B' brings the second UWB device (102) (say for example, a UWB enabled phone) within the communication range of the first UWB device (101) (say for example, a UWB enabled phone) of the User 'A'. However, the second UWB device (102) of the User 'B' has no information regarding the support and availability for the UWB payments service in the first UWB device (101) of the User 'A'. Therefore, the first UWB device (101) of the User 'A' provides a list of one or more UWB services (for example, a UWB Payments service, a UWB File transfer service and the like) and other configuration information for one or more UWB services supported by the first UWB device (101) of the User 'A' to the second UWB device (102) of the User 'B'. Further, User 'B' may selects the UWB Payments Service in the second UWB device (102), and proceed to initiate a payment transaction with the first UWB device (101) for sending money to the User 'A'.

Further, the User 'B' is willing to transfer one or more files to the User 'A' using a proximity based UWB File Transfer service. The User 'B' brings the second UWB device (102) (say for example, a UWB enabled phone) within the communication range of the first UWB device (101) (say for example, a UWB enabled phone) of the User 'A'. However, the second UWB device (102) of the User 'B' has no information regarding the support and availability of the UWB File Transfer Service in the first UWB device (101) of the User 'A'. Therefore, the second UWB device (102) of the User 'B' sends a query message to the first UWB device (101) of the User 'A'. The query message includes a request for the support of the UWB File Transfer service. The first UWB device (101) of the User 'A' responds with at least one of a "Success or yes" and other service details (like configuration and connection setup) if the UWB File Transfer service is supported by the first UWB device (101). Alternatively, the first UWB device (101) responds with a "Failure or no" if the UWB File Transfer service is not supported by the first UWB device (101). If the response from the first UWB device (101) is a "Success or yes" the User 'B' proceeds to share files from the second UWB device (102) with the first UWB device (101) of the User 'A'.

In a second example, consider FIG. 1C illustrating an example use case of performing a payment transaction between a first UWB device (101) and the second UWB device (102).

In an embodiment, a user with the second UWB device (102) (say for example, a UWB enabled phone) is willing to initiate a payment transaction with the first UWB device (101) (say for example, a wireless point of sale (PoS) terminal) in a shop using proximity based UWB Payments Service. The User brings the second UWB device (102) in the communication range of the first UWB device (101) i.e. PoS terminal. However, the second UWB device (102) has no information whether the first UWB device (101) i.e. PoS terminal supports the UWB payment service or not. Further, the first UWB device (101) i.e. the PoS terminal broadcasts the advertisement message (301) indicating the support for the UWB Payments Service along with other UWB services information (such as configuration and connection setup). The second UWB device (102) of the User receives the advertisement message (301) from the first UWB device (101) i.e. PoS terminal and proceeds to initiate the payment transaction from the second UWB device (102) with the first UWB device (101) i.e., PoS terminal.

In a third example, consider FIG. 1D illustrating an example scenario of using a UWB enabled phone as a remote control and a gaming joystick for operating a Television (TV).

Consider, the second UWB device (102) (say for example, a UWB enabled phone) of a user. The user is willing to use the second UWB device (102) as a remote control and as a gaming joystick for interacting with the first UWB device (101) (i.e. TV). However, the second UWB device (102) of the user is not aware if a UWB remote control service, and a UWB gaming service is supported by the first UWB device (101) (i.e. TV). Therefore, the TV advertises the list of one or more UWB services supported by the TV and other UWB service information (such as configuration and connection setup). For example, TV broadcasts the advertisement message (301) indicating a support for the UWB remote control service and the UWB gaming service. The second UWB device (102) of the User reads the broadcasted advertisement message (301) and selects the UWB remote control service. Further, the user operates and controls the first UWB device (101) (i.e. TV) using the second UWB device (102). Furthermore, the User may select the UWB gaming service and use the second UWB device (102) as the joystick for interacting with the first UWB device (101) (i.e. TV) for playing games.

In another embodiment, the second UWB device (102) of the User may query for the list of one or more UWB services supported by the first UWB device (101) (i.e., TV). The TV responds to the query with the UWB remote control service, the UWB gaming service and other UWB services information (such as configuration and connection setup). Further. The second UWB device (102) of the User reads the response to the query and selects the UWB remote control service. The user controls the TV using the second UWB device (102). Furthermore, the User may select the UWB gaming service and uses the second UWB device (102) as joystick for interacting with the TV for play the games.

In yet another embodiment, the second UWB device (102) of the User may query for a support for the UWB remote control service with the first UWB device (101) (i.e. TV). The TV responds with a "success or yes" and provides other UWB services information (such as configuration and connection setup). Further, the second UWB device (102) of the User reads the response to the query and the user uses the second UWB device (102) as a remote control for operating the TV. Furthermore, when the user wants to play games, the second UWB device (102) of the User may query for a support of the UWB gaming service with the first UWB device (101) (i.e. the TV). The TV may respond with the "success or yes" and provide other UWB services information to the second UWB device (102). The second UWB device (102) of the User reads the response to the query and uses the second UWB device (102) as the joystick for gaming and interacting with the TV.

In a fourth example, consider FIG. 1E illustrating an example scenario of using a UWB enabled phone as an access key for operating a car.

Consider a User willing to rent a car. The User moves towards the car and wishes to unlock doors of the car (i.e. first UWB device (101)) using the second UWB device (102) (say for example, a UWB enabled phone) of the User. However, the second UWB device (102) is not aware whether the car supports the UWB access service. Therefore, the car broadcasts the advertisement message (301) indicating a support for the UWB access service and provides other UWB services information required to enable the second UWB device (102) to be used as the UWB based key. The user may lock or unlock doors of the car using the second UWB device (102).

In a fifth example, consider FIG. 1F illustrating an example scenario of using a UWB enabled phone as a key for operating a door lock.

Consider, the user willing to unlock a door (i.e. first UWB device (101)) using the second UWB device (102) (say for example, a UWB enabled phone) of the user. The second UWB device (102) of the user supports the UWB physical access service and the second UWB device (102) is not aware whether the door supports the UWB physical access service. Therefore, the second UWB device (102) of the User sends a query for the supports of the UWB physical access service. The door responds with a "success or yes" and provides the UWB services information required to enable the second UWB device (102) of the user to be used as a key to open the door based on UWB access control service.

FIG. 2 shows an example flowchart illustrating a method of communicating UltraWide Band (UWB) services information supported by a first UWB device (101) to a second UWB device (102), according to the embodiments as disclosed herein.

At the step 201, the method comprises generating, by the first UWB device (101), an advertisement message (301) comprising at least one of a first field indicating an availability of the UWB services information before establishing an Out of Band (OOB) connection with the first UWB device (101), a second field indicating an availability of the UWB services information after establishing the OOB connection with the first UWB device (101), and a third field indicating an availability of the UWB services information in an in-band connection.

In an embodiment, the first UWB device (101) and the second UWB device (102) is one of the controller device or the controlee device. The advertisement message (301) generated by the first UWB device (101) indicating the availability of the UWB services information is as shown in FIG. 3.

In an embodiment, the first field indicates the availability of the UWB services information before establishing an Out of Band (OOB) connection with the first UWB device (101). For example, the first field may be denoted using a single bit or a flag, an integer number, and the like. When the first field is denoted using a single bit, and a value of the single bit equal to one '1' indicates that the UWB services information is available to the second UWB device (102) without establishing the OOB connection with the first UWB device (101). Further, when the first field is denoted using a single bit, and a value of the single bit equal to zero '0' indicates that the UWB services information is not available to the second UWB device (102) without establishing the OOB connection with the first UWB device (101). The first field denoted using a single bit is shown in Table 1.

TABLE 1

| Indication of the UWB services information available to be shared pre-association/pre-connection |
| --- |
| 1 bit |

Further, the first field indicates the availability of the UWB services information in at least one of the advertisement message (301) or an extended advertisement message (304) or a scan response message (303). The availability of the UWB services information indicates a location of the presence of the UWB services information.

In an embodiment, the second field indicates the availability of the UWB services information after establishing the OOB connection with the first UWB device (101). For example, the second field may be denoted using a single bit or a flag, an integer number, and the like. When the second field is denoted using a single bit, and a value of the single bit equal to one '1' indicates that the UWB services information is available to the second UWB device (102) after establishing the OOB connection with the first UWB device (101). Further, when the second field is denoted using a single bit, a value of the single bit equal to zero '0' indicates that the UWB services information is not available to the second UWB device (102) after establishing the OOB connection with the first UWB device (101). The second field denoted using a single bit is shown in Table 2.

TABLE 2

| Indication for UWB services info available to be shared post-association/post-connection |
| --- |
| 1 bit |

Further, the second UWB device (102) obtains the UWB services information from the first UWB device (101) in the OOB UWB service information response message (306) using the OOB communication protocol. The OOB communication protocol comprises one of the Bluetooth protocol, the Wireless Fidelity (Wi-Fi) protocol, and the Near Field Communication (NFC) protocol.

In an embodiment, the third field indicates the availability of the UWB services information in the in-band connection. For example, the third field may be denoted using a single bit or a flag, an integer number, and the like. When the third field is denoted using a single bit, a value of the single bit equal to one '1' indicates that the UWB services information is available to the second UWB device (102) in the in-band connection. Further, when the third field is denoted using a single bit, a value of the single bit equal to zero '0' indicates that the UWB services information is not available to the second UWB device (102) in the in-band connection. The third field denoted using a single bit is shown in Table 3.

TABLE 3

| Indication for UWB services info available to be shared in-band |
| --- |
| 1 bit |

Further, the second UWB device (102) obtains the UWB services information from the first UWB device (101) in an in-band UWB service information response message (308) using the in-band communication protocol. The in-band communication protocol comprises the UWB protocol.

In an embodiment, when the first field, the second field, and the third field are denoted using a three single bits in the advertisement message (301), the three single bits may have a value equal to one "1" or zero "0". For example, if the value of the single bit corresponding to the second field and the third field is equal to one "1", the value of the single bit corresponding to the first field is equal to zero '0'. Then, in one embodiment, the second UWB device (102) may obtain the UWB services information after establishing the OOB connection with the first UWB device (101) using the OOB UWB service information response message (306). In another embodiment, the second UWB device (102) may obtain the UWB services information using the in-band UWB service information response message (308) in the in-band connection.

At the step 202, the method comprises periodically broadcasting, by the first UWB device (101), the advertisement message (301) using an Out of Band (OOB) communication protocol.

In an embodiment, periodically broadcasting, by the first UWB device (101), the advertisement message (301) comprises sending the advertisement message (301) using the OOB communication protocol after completion of a predefined time period denoted by signal 1 in FIG. 3. The pre-defined time period is configured in the memory (101A) of the first UWB device (101). For example, the pre-defined time period may be 10 milliseconds, 20 milliseconds and the like. The OOB communication protocol comprises one of a Bluetooth protocol, a Wireless Fidelity (Wi-Fi) protocol, and a Near Field Communication (NFC) protocol.

Further, the second UWB device (102) receives the advertisement message (301) when the second UWB device (102) is in the communication range of the first UWB device (101).

In an embodiment, the second UWB device (102) reads the advertisement message (301) and identifies the availability of the UWB services information based on a value of the first field, the second field and the third field.

In a first embodiment, if the first field indicates the availability of the UWB services information, then the second UWB device (102) obtains the UWB services information within the advertisement message (301) using the OOB communication protocol as shown in FIG. 4. The UWB services information corresponds to the one or more UWB services supported by the first UWB device (101). Further, the second UWB device (102) obtains the UWB services information before establishing the connection with the first UWB device (101) (i.e. pre-association or pre-connection).

In a second embodiment, if the first field indicates the availability of the UWB services information, then the second UWB device (102) may generate and send a scan request message (302) as shown by signal 2 in FIG. 5. The scan request message (302) includes the query whether the one or more UWB services are supported by the first UWB device (101). The first UWB device (101) upon receiving the scan request message (302), generates and sends the scan response message (303) to the second UWB device (102) as shown by the signal 3 in FIG. 5. The scan response message (303) comprises "Success or yes" corresponding to the one or more UWB services supported by the first UWB device (101) and the corresponding UWB services information. Further, the scan response message (303) comprises "failure or no" corresponding to the one or more UWB services not supported by the first UWB device (101). Further, the second UWB device (102) obtains the UWB services information before establishing the connection with the first UWB device (101) (i.e. pre-association or pre-connection).

In an third embodiment, if the first field indicates the availability of the UWB services information, then the second UWB device (102) may receive the extended advertisement message (304) after receiving the advertisement message (301) as shown by the signal 2 in FIG. 6. Further, the extended advertisement message (304) comprises the UWB services information corresponding to the one or more UWB services supported by the first UWB device (101). Further, the second UWB device (102) obtains the UWB services information before establishing the connection with the first UWB device (101) (i.e. pre-association or pre-connection).

In an embodiment, the UWB services information in the advertisement message (301), or in extended advertisement message (304), or in the scan response message (303) is denoted using the bitmask representation. Further the bitmask representation may be denoted using "N" bits when a count of the one or more UWB services supported by the first UWB device (101) is equal to "N". For example, the bitmask representation may be denoted as "0100" where 5 bits denote 5 UWB services and a value "0" indicates no support and a value "1" indicates a support for the corresponding UWB service. The bitmask or bloom filter representation of the UWB services information is shown in Table 4.

TABLE 4

| S. No | Contents of the pre-association/pre-connection UWB services Information IE | Size in bits |
|---|---|---|
| 1 | Bitmask/Bloom filter representation of UWB services supported | N bits |

In an embodiment, the UWB services information in the advertisement message (301), or in extended advertisement message (304), or in the scan response message (303) is denoted using one or more UWB service information Identification value corresponding to the one or more UWB services. The UWB services information is denoted using a list of UWB services supported by the first UWB device (101) as shown in Table 5. The value "N" denotes a count of the one or more UWB services supported by the first UWB device (101). Further, the UWB services information includes the UWB service information Identification value (i.e. UWB service Identifier) corresponding to the one or more UWB services as shown in Table 6.

TABLE 5

| S. No | Contents of the pre-association/pre-connection UWB services Information IE | Size in bits |
|---|---|---|
| 1 | List of UWB service information IE for services supported | Variable (N * 16 bits) |

TABLE 6

| S. No | Contents of UWB service information IE | Size in bits |
|---|---|---|
| 1 | UWB service identifier | 16 bits |

In an embodiment, the second UWB device (102) reads the advertisement message (301) and identifies the availability of the UWB services information after establishing the OOB connection with the first UWB device (101) based on a value of the second field in the advertisement message (301) as shown by signal 1 in FIG. 7. The second UWB device (102) sets up the OOB connection with the first UWB device (101) as shown by signal 2 in FIG. 7.

Further, the first UWB device (101) receives an OOB UWB service information request message (305) from the second UWB device (102) after establishing the OOB connection with the first UWB device (101) as shown by signal 3 in FIG. 7. The OOB UWB service information request message (305) comprises a query for a support of the one or more UWB services by the first UWB device (101) and the UWB services information corresponding to the one or more UWB services. The OOB UWB service information request message (305) is a CMD_GET_SERVICE_INFO comprising a value of a request type as GET.

The OOB UWB service information request message (305) for obtaining the UWB services information comprises a Num_of_Service field indicating a count of the one or more UWB services for which the UWB services information is requested. Further, OOB UWB service information request message (305) comprises one or more Service_ID fields indicating a UWB service Identification value corresponding to the one or more UWB services. The table 7 and table 8 below shows different embodiments for denoting the Num_of_Service field, one or more Service_ID fields in the OOB UWB service information request message (305).

TABLE 7

| S. No | Contents of the post-association/post-connection UWB services info request IE format 1 | Size in bits |
|---|---|---|
| 1 | UWB service Identifier | 16 bits |

TABLE 8

| S. No | Contents of the post-association/post-connection UWB services info Request IE format 2 | Size in bits |
|---|---|---|
| 1 | Number of UWB service | 16 |
| 2 | List of UWB service identifier for supported services | 16 bits * N |

In an embodiment, when the second UWB device (102) requests for all supported UWB services information, the UWB service Identifier='0' or NULL in format 1 and the list of UWB service identifier={0} or { } in format 2. The OOB UWB service information request message (305) is without any input parameters.

In an embodiment, when the second UWB device (102) requests for a single UWB services information, the UWB service identifier is a 16-bit value in format 1. The list of UWB service identifier comprises {UWB service Id}, and a Num of UWB service=1 in format 2.

In an embodiment, when the second UWB device (102) requests for a plurality of UWB services information, the List of UWB service identifiers comprises the UWB service identifiers and the number of UWB service is a count of the UWB services for which the support is requested in format 2.

In an embodiment, after receiving the OOB UWB service information request message (305), the first UWB device (101) generates the OOB UWB service information response message (306) comprising a support for a subset of the one or more UWB services supported by the first UWB device (101) and the UWB services information corresponding to the one or more UWB services. Further, the first UWB device (101) sends the OOB UWB service information response message (306) to the second UWB device (102) as shown by signal 4 in FIG. 7.

In an embodiment, the OOB UWB service information response message (306) for providing the UWB services information comprises a Num_of_Service field indicating a count of the one or more UWB services supported by the first UWB device (101). Further, the OOB UWB service information response message (306) comprises one or more Service_ID fields indicating a UWB service Identification value corresponding to the one or more UWB services supported by the first UWB device (101). Furthermore, the OOB UWB service information response message (306) comprises one or more common parameters field. Thereafter, the OOB UWB service information response message (306) comprises a length of extended service information field indicating a length of the extended service information field in bytes, and an extended service information data. The Table 9, Table 10, Table 11, and Table 12 below show different embodiments for denoting the OOB UWB service information response message (306).

TABLE 9

| S. No | Contents of the post-association/post-connection UWB services info response IE | Size in bits |
|---|---|---|
| 1 | Number of UWB service information IE | 16 bits |
| 2 | List of UWB service information IE for supported services | Variable (N * size of UWB service info IE) |

TABLE 10

| S. No | Contents of UWB service information IE | Size in bits |
|---|---|---|
| 1 | UWB service Identifier | 16 bits |
| 2 | Common service parameters | 24 |
| 3 | Extended service information | variable |

TABLE 11

| S. No | Contents of Extended Service information | Size in bits |
|---|---|---|
| 1 | Length of extended service information | 32 bits |
| 2 | Extended service information data | variable |

TABLE 12

| Contents of the post-association/post-connection UWB services Information response IE | Size in bits |
|---|---|
| Bitmask/Bloom filter representation of UWB services supported | N bits |

In an embodiment, the second UWB device (102) reads the advertisement message (301) and identifies the availability of the UWB services information in the in-band connection based on the third field in the advertisement message (301) as shown by signal 1 in FIG. 8.

In an embodiment, the first UWB device (101), receives an in-band UWB service information request message (307) from the second UWB device (102) in the in-band connection as shown by signal 2 in FIG. 8. The in-band UWB service information request message (307) comprises a query for a support of the one or more UWB services by the first UWB device (101) and the UWB services information corresponding to the one or more UWB services. The in-band UWB service information request message (307) is a CMD_GET_SERVICE_INFO comprising a value of a request type as GET.

In an embodiment, the in-band UWB service information request message (307) for obtaining the UWB services information comprises a Num_of_Service field indicating a count of the one or more UWB services for which the UWB services information is requested. Further, the in-band UWB service information request message (307) comprises one or more Service_ID fields indicating a UWB service Identification value corresponding to the one or more UWB services.

In an embodiment, in-band UWB service information request message (307) comprises one or more Service_ID fields indicating a UWB service Identification value corresponding to the one or more UWB services. The table 13 and table 14 below shows different embodiments for denoting the Num_of_Service field, one or more Service_ID fields in the in-band UWB service information request message (307).

TABLE 13

| S. No | Contents of the in-band UWB services info request IE format 1 | Size in bits |
|---|---|---|
| 1 | UWB service Identifier | 16 bits |

TABLE 14

| S. No | Contents of the in-band UWB services information Request IE format 2 | Size in bits |
|---|---|---|
| 1 | Number of UWB service | 16 |
| 2 | List of UWB service identifier for supported services | 16 bits * N |

In an embodiment, when the second UWB device (102) requests for all supported UWB services information, the UWB service Identifier='0' or NULL in format 1. The list of UWB service identifier={0} or { } in format 2. The in-band UWB service information request message (307) is without any input parameters.

In an embodiment, when the second UWB device (102) requests for a single UWB services information, the UWB service identifier is a 16-bit value in format 1. The list of UWB service identifier comprises {UWB service Id}, and a Num of UWB service=1 in format 2.

In an embodiment, after receiving the in-band UWB service information request message (307), the first UWB device (101) generates the in-band UWB service information response message (308) comprising a support for a subset of the one or more UWB services supported by the first UWB device (101) and the UWB services information corresponding to the one or more UWB services. Further, the first UWB device (101) sends the in-band UWB service information response message (308) to the second UWB device (102) using the in-band connection as shown in signal 3 in FIG. 8.

In an embodiment, the in-band UWB service information response message (308) for providing the UWB services information using in-band communication protocol comprises at least one of a Num_of_Service field indicating a count of the one or more UWB services supported. Further, the in-band UWB service information response message (308) comprises one or more Service_ID fields indicating a UWB service Identification value corresponding to the one or more UWB services supported by the first UWB device (101). Furthermore, the in-band UWB service information response message (308) comprises one or more common parameters field. Thereafter, the in-band UWB service information response message (308) comprises a length of extended service information field indicating a length of the extended service information field in bytes, and an extended service information data. The Table 15, Table 16, Table 17, and Table 18 below show different embodiments for denoting the in-band UWB service information response message (308).

TABLE 15

| S. No | Contents of the in-band UWB services info response IE | Size in bits |
|---|---|---|
| 1 | Number of UWB service information IE | 16 bits |
| 2 | List of UWB service information IE for supported services | Variable (N * size of UWB service info IE) |

TABLE 16

| S. No | Contents of UWB service information IE | Size in bits |
|---|---|---|
| 1 | UWB service Identifier | 16 bits |
| 2 | Common service parameters | 24 |
| 3 | Extended service information | variable |

TABLE 17

| S. No | Contents of Extended Service information | Size in bits |
|---|---|---|
| 1 | Length of extended service information | 32 bits |
| 2 | Extended service information data | variable |

TABLE 18

| Contents of the post-association/post-connection UWB services Information response IE | Size in bits |
|---|---|
| Bitmask/Bloom filter representation of UWB services supported | N bits |

FIG. 9 illustrates a flow chart of a method performed by a first UWB device according to an embodiment of the disclosure.

A first UWB device and a second UWB device described with reference to FIG. 9 may correspond to the second UWB device (102) and the first UWB device (101) in FIG. 7, respectively.

In step 901, the first UWB device may transmit, to a second UWB device, a request message for fetching service related information for at least one service. For example, in order to identify whether the second UWB device supports a particular service, the first UWB device may transmit the request message to the second UWB device.

In an embodiment, the request message may comprise a parameter indicating a number of services for which the service related information is requested and a parameter indicating a service identifier of the at least one service.

In an embodiment, the service related information for all services supported by the second UWB device is requested in case that a value of the parameter indicating the service identifier is set to zero. The first UWB device may request list of all services supported by the second UWB device by setting the value of the parameter indicating the service identifier as zero.

In step 903, in case that the at least one service is supported by the second UWB device, the first UWB device may receive, from the second UWB device, a response message including the service related information for the at least one service.

In an embodiment, the response message may comprise common parameters for the at least one service and extended service information for the at least one service. The extended service information may comprise a field for a length of the extended service information and extended service information data.

Based on the response message, the first UWB device may identify whether a particular service is supported by the second UWB device or list of services supported by the second UWB device. In case that the first UWB device identifies that the particular service is supported by the second UWB device, the first UWB device may performed the particular service with the second UWB device.

FIG. 10 illustrates a flow chart of a method performed by an UWB device according to an embodiment of the disclosure.

The UWB device described with reference to FIG. 10 may correspond to the first UWB device 101 in FIG. 4 to FIG. 6.

In step 1001, the UWB device may generate service related information indicating whether at least one service is supported by the UWB device and an availability of service information for the at least one service as an out of band (OOB) UWB message.

In an embodiment, the service related information may further indicate a presence of the service information in an advertisement or an extended advertisement or a scan response.

In step 1003, the UWB device may broadcast the service related information.

In an embodiment, the service related information may comprise the service information. For example, the service related information may correspond to the advertisement.

In an embodiment, the service information may comprise a bitmask indicating whether the at least one service is supported by the UWB device and each bit of the bitmask may be mapped to a service identifier. A value of each bit of the bitmask may indicate whether a service corresponding to the service identifier is supported.

In another embodiment, the UWB device may transmit the service information for the at least one service via the extended advertisement or the scan response after broadcasting the service related information.

In accordance with an embodiment of the disclosure, a first ultra wide band (UWB) device in a wireless communication system is provided. The first UWB device may comprise: a transceiver; and at least one processor configured to: transmit, to a second UWB device via the transceiver, a request message for fetching service related information for at least one service; and in case that the at least one service is supported by the second UWB device, receive, from the second UWB device via the transceiver, a response message including the service related information for the at least one service.

The embodiments disclosed herein can be implemented using at least one software program running on at least one hardware device and performing network management functions to control the elements.

The software program may include instructions stored in a computer-readable storage medium.

The computer is a device capable of calling the stored instructions from the storage medium and performing the operations of the embodiment of the disclosure according to the called instructions. The computer may include an image transmitting apparatus and an image receiving apparatus according to the embodiments of the disclosure.

The computer-readable storage medium may be provided in the form of a non-transitory storage medium. The term "non-transitory" means that the storage medium does not include a signal and is tangible, and does not limit that data is stored in the storage medium semi-permanently or temporarily.

Also, the electronic devices or the methods according to the embodiments of the disclosure may be provided in a state of being included in a computer program product. The computer program product may be traded between a seller and a buyer as a product.

The computer program product may include a software program and a computer-readable storage medium on which the software program is stored. For example, the computer program product may include a product (e.g., downloadable app) of a software program form that is distributed electronically through an electronic device manufacturer or an electronic market (e.g., Google Play Store, App Store, etc.). For electronic distribution, at least part of the software program may be stored in a storage medium or may be temporarily generated. In this case, the storage medium may be a server of a manufacturer, a server of an electronic market, or a storage medium of a relay server temporarily storing a software program.

In a system including a server and a terminal (e.g., an electronic device), the computer program product may include a storage medium of the server or a storage medium of the terminal. Alternatively, when a third device (e.g., a smart phone) communicatively connected to a server or a terminal is present, the computer program product may include a storage medium of the third device. Alternatively, the computer program product may include a software program itself that is transmitted from the server to the terminal or the third device or is transmitted from the third device to the terminal.

In this case, one of the server, the terminal, and the third device may execute the computer program product to perform the methods according to the embodiments of the disclosure. Alternatively, two or more of the server, the terminal, and the third device may execute the computer program product to perform the methods according to the embodiments of the disclosure in a distributed manner.

For example, the server (e.g., a cloud server or an artificial intelligence server, etc.) may execute the computer program product stored in the server to control the terminal communicatively connected to the server to perform the methods according to the embodiments of the disclosure.

As another example, the third device may execute the computer program product to control the terminal communicatively connected to the third device to perform the methods according to the embodiments of the disclosure. As a specific example, the third device may remotely control an image transmitting apparatus or an image receiving apparatus to transmit or receive a packing image.

When the third device executes the computer program product, the third device may download the computer program product from the server and execute the downloaded computer program product. Alternatively, the third device may execute the computer program product provided in a preloaded state to execute the methods according to the embodiments of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a first ultra-wide band (UWB) device in a wireless communication system, the method comprising:

transmitting, to a second UWB device, an out of band (OOB) request message for fetching service related information for at least one service, the OOB request message including a service identifier (ID) and a number of services; and receiving, from the second UWB device, an OOB response message including service related information corresponding to the service ID and the number of services, wherein the service related information corresponding to the service ID and the number of services corresponds to information for all services in case that a value of the service ID is set to zero.

2. The method of claim 1, wherein the OOB response message includes common service parameters.

3. The method of claim 1, wherein the OOB response message includes extended service information.

4. The method of claim 3, wherein the extended service information includes:

a field for a length of the extended service information, and extended service information data.

5. A method performed by an ultra-wideband (UWB) device in a wireless communication system, the method comprising:

broadcasting an advertisement message including information indicating a presence of UWB service information in at least one of the advertisement message, an extended advertisement message or a scan response message and information indicating UWB service information availability using an out of band (OOB) connection, wherein the UWB service information includes a bitmask of UWB services, wherein a bit of the bitmask is mapped to a service identifier (ID), and wherein a value of the bit indictes whether a service corresponding to the service ID is supported.

6. The method of claim 5, further comprising:

transmitting the UWB service information via the extended advertisement message or the scan response message.

7. A first ultra-wideband (UWB) device in a wireless communication system, the first UWB device comprising:

a transceiver; and at least one processor coupled to the transceiver and configured to:

transmit, to a second UWB device, an out of band (OOB) request message for fetching service related information for at least one service, the OOB request message including a service identifier (ID) and a number of services; and receive, from the second UWB device, an OOB response message including service related information corresponding to the service ID and the number of services, wherein the service related information corresponding to the service ID and the number of services corresponds to information for all services in case that a value of the service ID is set to zero.

\* \* \* \* \*